United States Patent [19]

White et al.

[11] 4,088,068
[45] May 9, 1978

[54] SLACKENING MECHANISM FOR BALE TIER

[75] Inventors: Allen Andrew White, Peabody; George Yatcilla; Garold Lee Fleming, both of Newton, all of Kans.

[73] Assignee: Hesston Corporation, Hesston, Kans.

[21] Appl. No.: 717,521

[22] Filed: Aug. 25, 1976

[51] Int. Cl.² .............................................. B65B 13/02
[52] U.S. Cl. .......................................................... 100/3
[58] Field of Search .................... 100/3, 17, 18, 19, 20, 100/21, 22, 23

[56] References Cited

U.S. PATENT DOCUMENTS

| 942,305 | 12/1909 | Bowers | 100/22 |
|---|---|---|---|
| 2,589,083 | 3/1952 | Hill | 100/21 |
| 2,649,043 | 8/1953 | Jones | 100/21 |
| 3,862,592 | 1/1975 | Freeman | 100/21 |

Primary Examiner—Billy J. Wilhite
Attorney, Agent, or Firm—Schmidt, Johnson, Hovey & Williams

[57] ABSTRACT

Bales are successively formed in the baling chamber of the machine by intermittently packing an additional charge of new material against the trailing end of a forming bale to progressively push the bales toward the discharge end of the chamber. When the bale reaches its predetermined size, a needle swings across the bale chamber behind the trailing end of the bale and presents a binding strand to a knotter. The knotter unites the presented end of the strand with an end previously held by the knotter during a packing cycle such as to form a secure, tied loop about the bale. As the needle retracts from the knotter, it places a new length of strand across the bale chamber in preparation for the loop around the next, succeeding bale, and it is during such retraction of the needle that a slackening device draws a supply of slack in the strand and lays the same along the proximal side of the preceding bale. Hence, as the next bale is incrementally advanced through the chamber, the slack supply becomes progressively depleted as it strings out along the forming bale. Thus, until the slack supply is entirely consumed, the strand need not be pulled through the interface between the preceding and forming bales in order to string out the strand along the bale.

4 Claims, 10 Drawing Figures

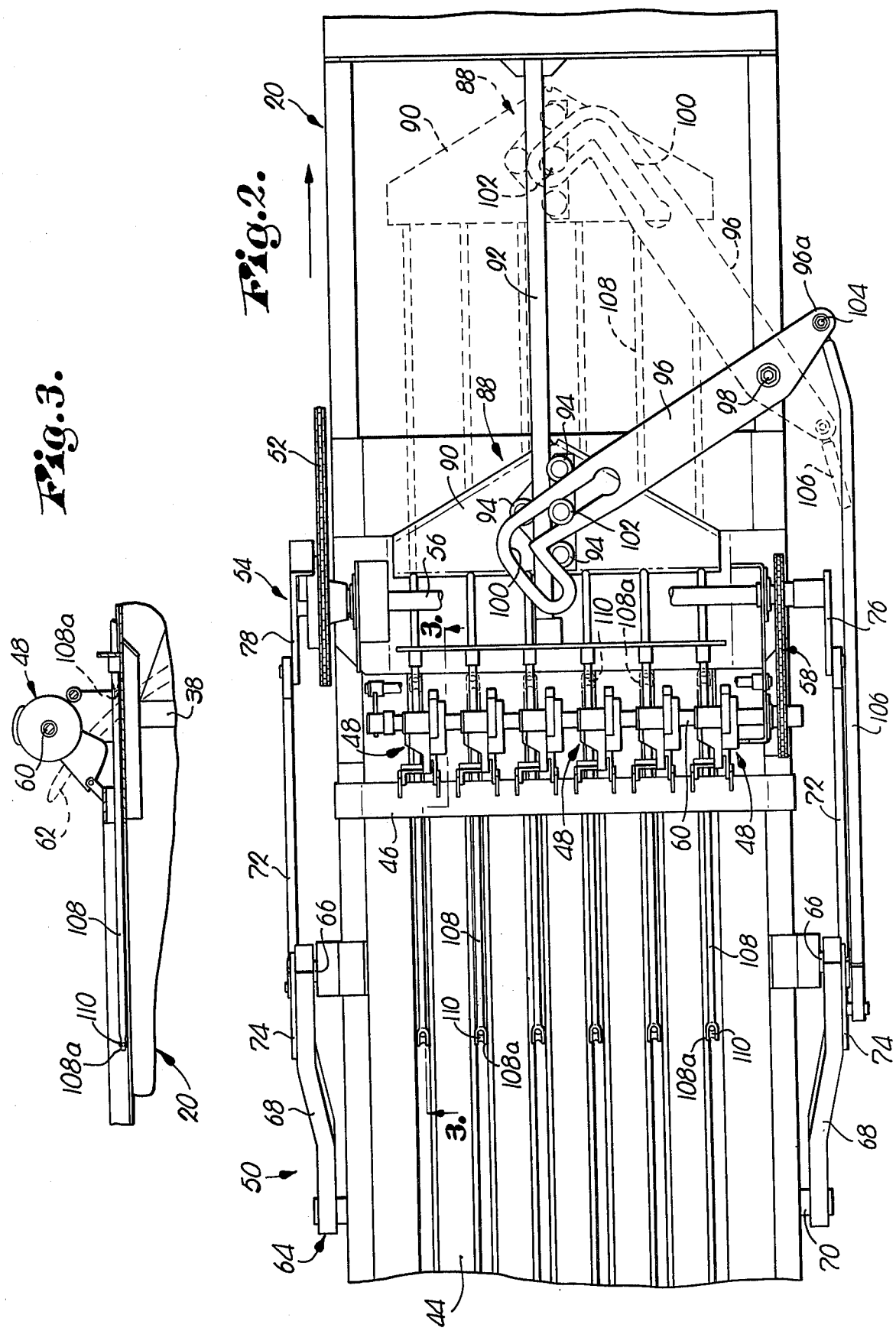

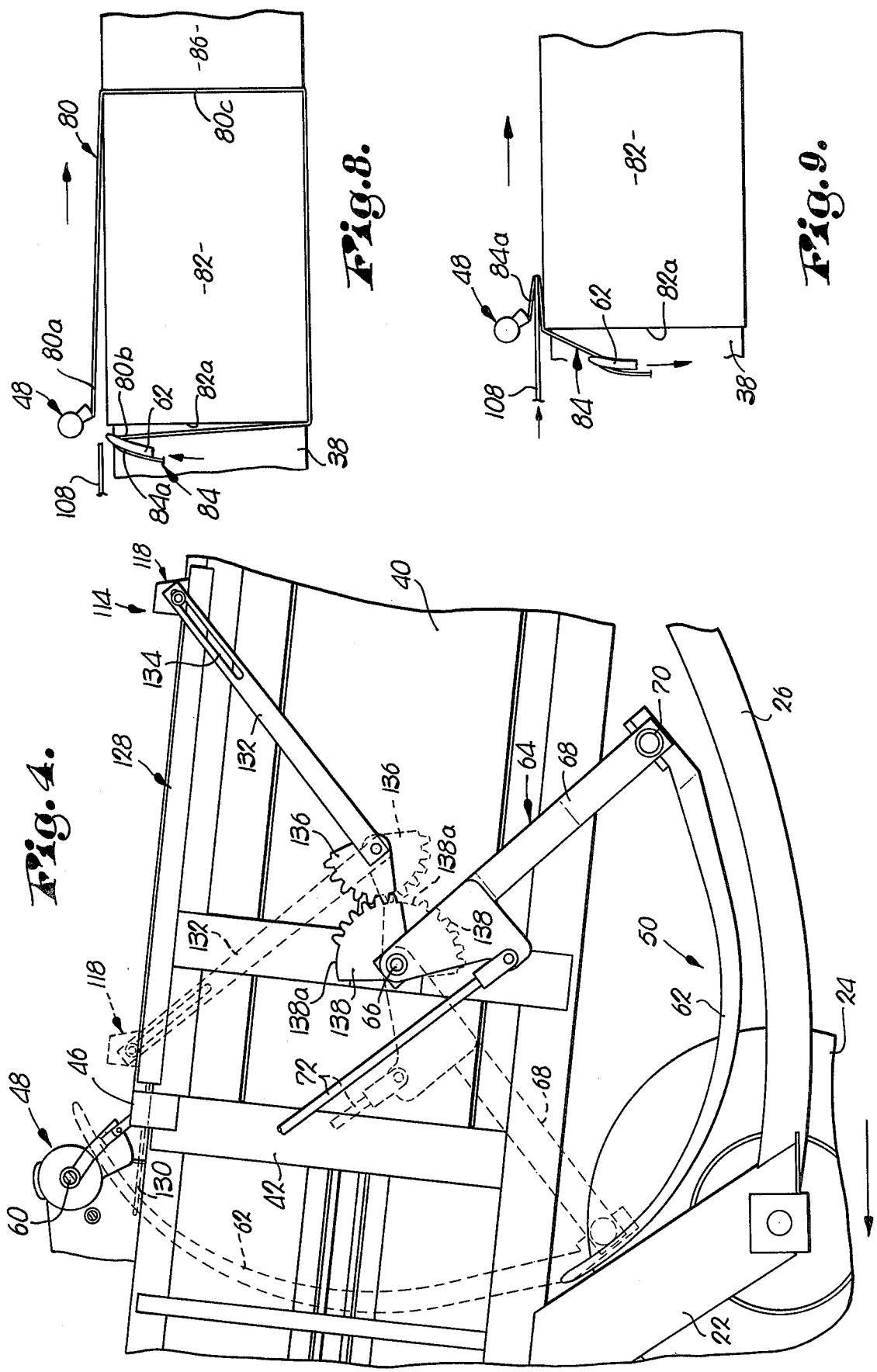

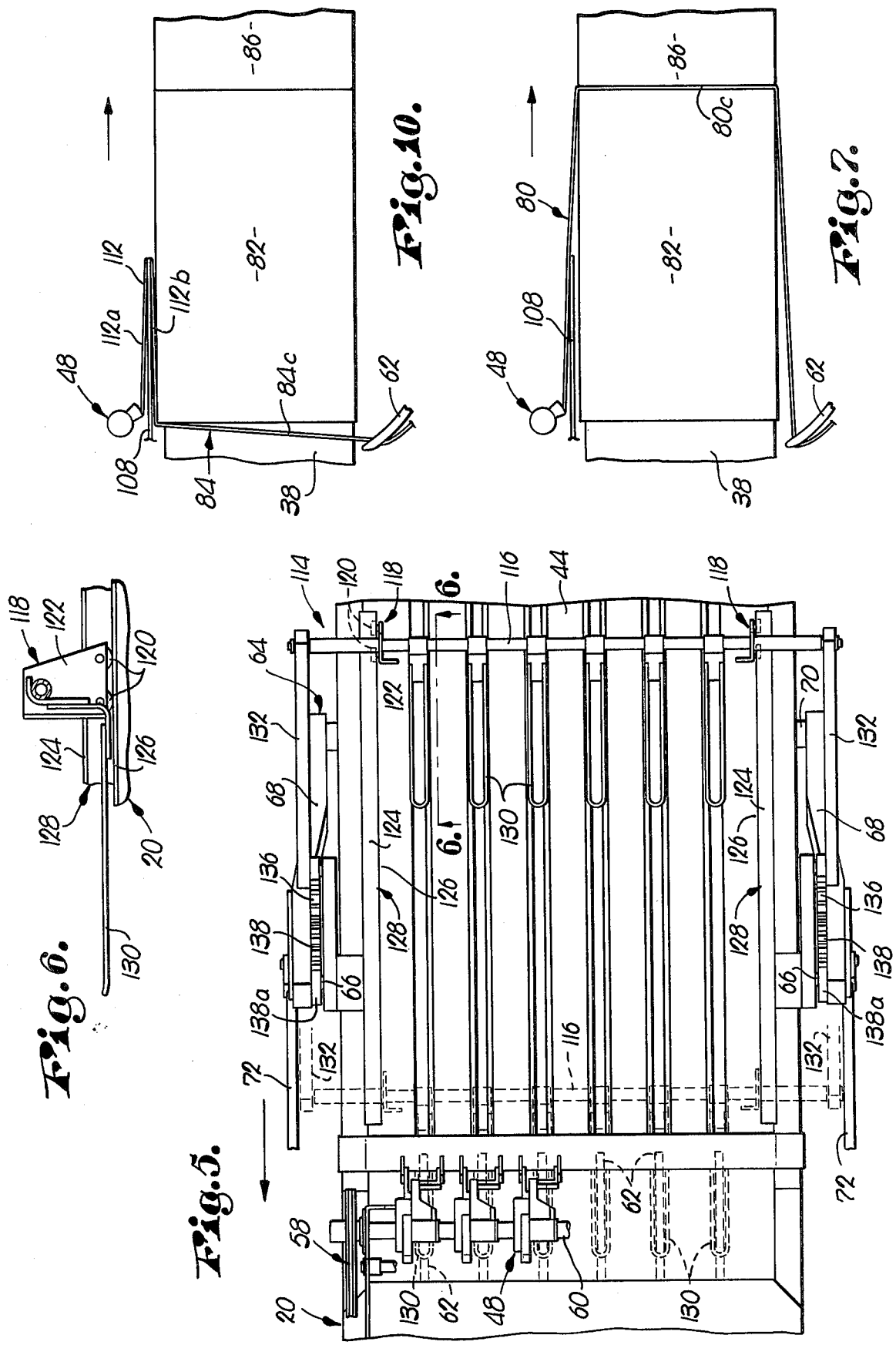

SLACKENING MECHANISM FOR BALE TIER

This invention relates to the formation of tightly compacted bales of crop material and the like and, more particularly, to the manner in which twine or other strands of material are used to tightly bind the bales upon completion of the forming process.

In a typical baler which is advanced across a field to pick up ground-lying crops and pack the same intermittently into a baling chamber, the bales are butted end-to-end within the bale chamber as they are moved toward the discharge outlet thereof. The desired density for the bales is obtained by restricting the discharge outlet such that the bales move through the chamber under substantial resistance, thereby providing, in effect, a backstop or anvil against which each new charge of material can be packed. Under such circumstances the interface between the immediately preceding bale and the one under formation can be under considerable pressure, and yet it is necessary in conventional systems to pull twine or wire through such pressurized interface as the bale grows in length. The amount of twine or wire (hereinafter collectively referred to as a strand) pulled through the interface depends upon the length of the bale being produced.

In situations where bales are desired having high density and large overall dimensions such that substantial surface area is presented at the interface, the strand may be pulled through the interface only with considerable difficulty and, in fact, the resistance may be so great that the strand may either break or be pulled loose from the knotter. Either of these occurrences will result in a bale that is not properly bound such that it may simply break apart as it hits the ground and be lost insofar as future handling and storage is concerned.

Accordingly, it is one important object of the present invention to provide a way of tying or building the bales in the traditional manner but without the need for pulling the necessary lengths of strand through the tight interface between two bales.

Another important object of this invention is to achieve the foregoing by drawing a supply of slack in the strand immediately after the knot has been tied on the preceding bale such that the slack supply is available for progressive depletion by the next forming bale as the latter is incrementally advanced through the baling chamber.

An additional important object of the present invention is to draw such slack into a position that it is located harmlessly away from the numerous moving parts of the baling machine to avoid entanglement therewith during the many movements necessary to accomplish complete bale formation and binding. In the specific arrangements illustrated herein, the slack supply is conveniently placed on top of and along the immediately preceding bale to be simply stripped off the preceding bale by the one being formed as the latter is pushed through the baling chamber.

Further important objects of the invention include the provision of alternative ways of accomplishing the same foregoing goals.

In the drawings:

FIG. 2 is a top plan view thereof with the slackening mechanism illustrated in its alternative, extreme positions;

FIG. 3 is a fragmentary, vertical cross-sectional view through the top part of the baler illustrating the relationship between the knotter, tying needle, and the slackening mechanism, such view being taken along line 3—3 of FIG. 2; FIG. 4 is a fragmentary, left side elevational view of the baler illustrating its use with a second form of slackening mechanism;

FIG. 5 is a top plan view thereof;

FIG. 6 is a slightly enlarged, fragmentary, vertical cross-sectional view through the slackening mechanism of the second form of slackening mechanism taken along line 6—6 of FIG. 5; and FIGS. 7, 8, 9 and 10 are schematic views on a reduced scale illustrating the sequence of steps in the production of a tied bale including the drawing and depletion of a slack strand supply.

Figure 1:
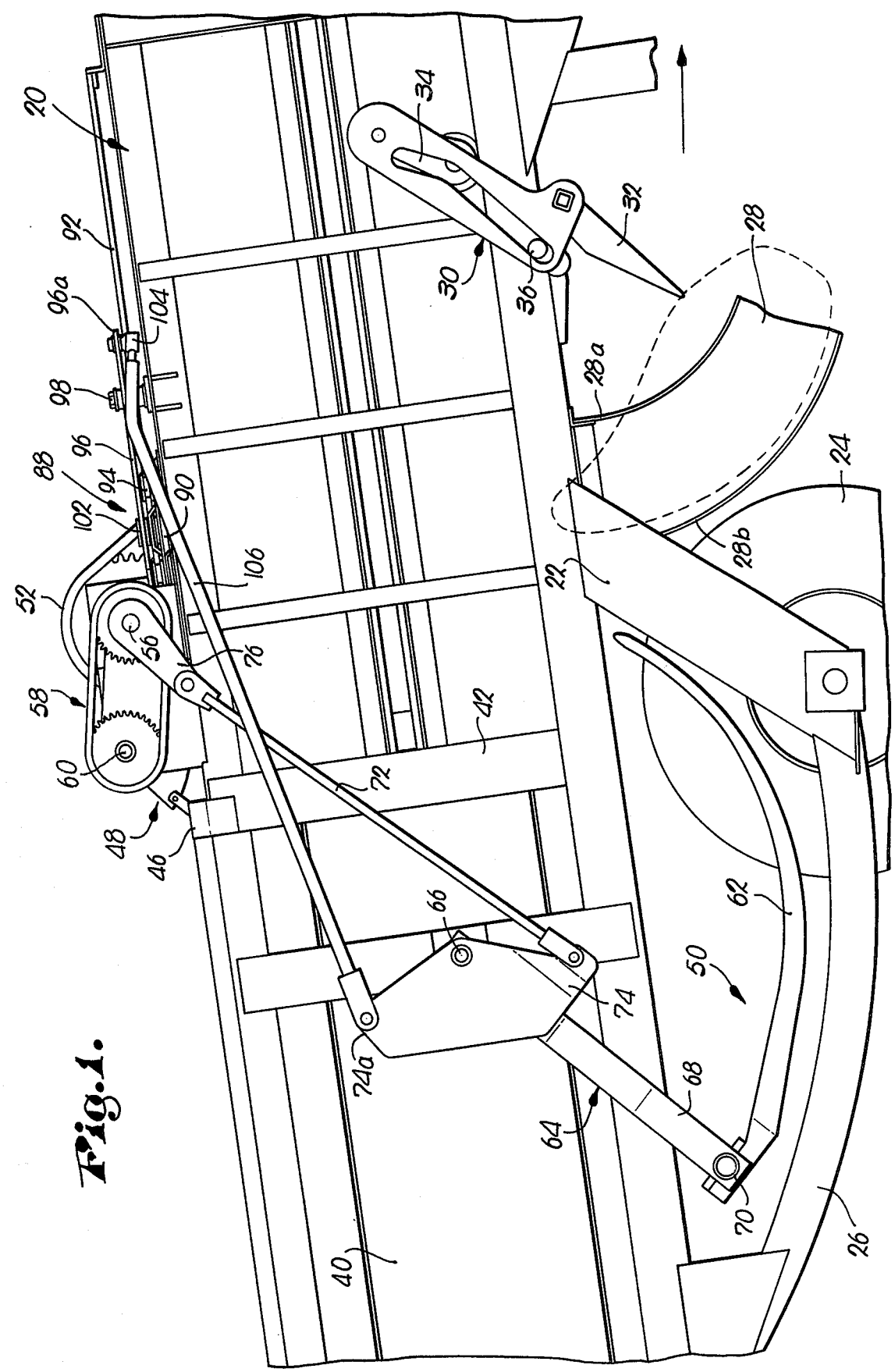
FIG. 1 is a fragmentary, right side elevational view of a baler utilizing slackening mechanism in accordance with the principles of the present invention.

The baler shown in FIG. 1 for purposed of illustrating the principles of the present invention has a fore-and-aft, longitudinally extending bale case denoted generally by the numeral 20. Struts 22 depend from the bale case 20 on opposite lateral sides thereof and support a pair of ground-engaging wheels 24 to render the case 20 mobile. Braces 26, which are slightly downwardly arched on opposite sides of the bale case 20, interconnect the struts 22 and the case 20 to provide rigidity to the overall structure.

Although not illustrated herein, it is to be understood that the baler includes means adjacent the forward end thereof for picking up windrowed crop material as the machine is advanced across a field. The picked-up material is then delivered rearwardly into an upwardly and rearwardly curved loading duct 28 that leads to an opening (not shown) in the bottom of the bale case 20 just ahead of the wheels 24. A stuffing ford 30 having prongs 32 is operated by a crank 34 about a fulcrum 36 for periodically moving through a kidney-shaped path of travel downwardly into, upwardly along, and thence back out of the duct 28 for the purpose of stuffing a charge of material into the bale case 20 from the ducts 28. Although not illustrated in detail, it is to be understood that the duct 28 extends across the full width of the bale case 20, as does the bottom opening in the latter, and the prongs 32 are similarly positioned across the bottom of the bale case 20 in alignment with a series of longitudinally extending slots in the duct 28 which permit the entry and travel of the prongs 32.

As in customary in crop balers of this type, a ram or plunger is provided within the bale case 20 for longitudinal reciprocation therein in order to pack charges that are successively presented to the chamber defined within the bale case 20 . Such a plunger is illustrated schematically in FIGS. 7-10 and is denoted by the numeral 38. The plunger 38 reciprocates between a retracted position slightly to the right of the front wall 28a of the duct 28, viewing FIG. 1, and an extended position somewhat rearwardly of the rear wall 28b thereof.

In order to provide resistance to the packing efforts of the plunger 38 such as to densify the material being acted upon, the bale case 20 has rearwardly disposed opposite side panels 40 which are swingably mounted about generally upright axes at the upright, structural members 42 located just rearwardly of the struts 22. If desired, the top of the bale case 20 in that particular area may also be adjustable inwardly and outwardly of the baling chamber for the purpose of controlling the dimensions thereof, and in such event, the top 44 as illustrated in FIG. 2, would be hinged about a horizontal transverse axis at the structural cross member 46 which bridges the two structural side members 42. By controlling the inward and outward movement of the side panels 40 and the top 44 through manual or automatic means not shown, the dimensions of the baling chamber adjacent its rear discharge end may be constricted or expanded such as to make it easier or more difficult for the plunger 38 to force a bale through the chamber. Consequently, in this manner the density of the forming bale may be quite closely controlled.

During the bale-forming process, the bale taking shape within the chamber is packed rearwardly by the plunger 38 against the immediately preceding bale such that the latter serves as a backstop or anvil for the forces applied by the plunger 38. Once the forming bale has reached a predetermined size, it is bound with strands of twine or wire so as to retain its integrity as a compacted, dense bale of preselected size. Such binding or tying of the bale is effected through a bank of knotters 48 across the top of the bale case 20 working in conjunction with apparatus 50 for looping the strands about the bale and presenting strand ends to the knotters 48 for tying. As illustrated in FIG. 2, six individual knotters 48 have been shown, although of course, the particular number selected for use is of no consequence insofar as the principles of the present invention are concerned. Each of the knotters 48 chosen for illustration is of conventional design and, in this particular instance, are designed for tying knots in twine as apposed to wire, although it will be appreciated that the principles hereinafter elaborated upon apply equally as well to both twine and wire.

In order to actuate the knotters 48, a constantly moving drive chain 52 (FIG. 2) extends along the left side of the bale case 20 from a source of driving power (not shown). The chain 52 is operably coupled with a conventional "dog" clutch 54 having an output shaft 56 which traverses the bale case 20 across the top of the latter as illustrated in FIG. 2. A chain and sprocket assembly 58 on the right side of the bale case 20 receives power from the shaft 56 when the latter is operably engaged by the clutch 54 to, in turn, drive an input shaft 60 common to all of the knotters 48 and extending across the top of the bale case 20 slightly rearwardly of the shaft 56. If desired, the clutch 54 may be automatically actuated by means not shown, which senses the length of the bale forming within the chamber and in response to the bale reaching a predetermined length, automatically actuates the clutch 54. On the other hand, of course, the clutch 54 may be manually engaged.

The apparatus 50 includes a series of arcuate, upturned elongated tying needles 62 (one only of which is shown in FIG. 1) corresponding in number to the knotters 48 and carried by a yoke 64 pivotally attached to opposite sides of the bale case 20 at 66. The yoke 64 includes a pair of arms 68 depending from the opposite pivots 66 and a common support bar 70 interconnecting the arms 68 beneath the case 20 and providing a cantilever point of attachment for the needles 62. The apparatus 50 further includes of pair of driving links 72 on opposite sides of the bale case 20, each of which is pivotally connected at its lower end to one end of a crank plate 74 rigid to the corresponding arm 68. At their upper ends, the links 72 are pivotally connected to a pair of driven cranks 76 and 78, the crank 76 on the right side of the case 20 being rigidly connected to the shaft 56 for rotation thereby, and the crank 78 on the left side of the bale case 20 being associated with the clutch 54 for actuation by the chain 52 when the clutch 54 is engaged. Consequently, when the clutch 54 is engaged, the yoke 64 is operated about the pivots 66 to swing the needles 62 back-and-forth across the baling chamber between the lowered position illustrated in FIG. 1 and the fully raised position illustrated in phantom in FIG. 3.

Such movement on the part of the needles 62 is synchronized with the plunger 38 such that the needles 62 only swing upwardly through the baling chamber at a time when the plunger 38 is fully extended rearwardly into position overlying the needles 62. Apertures (not shown) in the bottom of the bale case 20 permit entry of the needles 62, and vertical slots in the plunger 38 (also not shown but well understood by those in the art) permit the passage of the needles 62 upwardly toward the knotters 48 and then downwardly to their lowered positions while the plunger 38 remains fully extended.

As well understood in the art, the purpose of the needles 62 is to present the ends of binding strands to the knotters 48 to complete a loop about a finished bale and to prepare for the formation of a loop about the next bale to be made in the chamber. This is shown for example, in the schematic illustration of FIG. 8, wherein the knotter 48 holds one end 80a of a strand 80 looped around a finished bale 82, while a needle 62 approaches the knotter 48 with a second, opposite end 80b of the strand 80. The knotter 48 receives the strand end 80b from the needle 62, ties the knot, and severs the loop thus formed from the next strand 84 also carried by the needle 62 which is, of course, an integral part of a common length of wire or twine with the strand 80 prior to such severance.

The knotter 48 is also operable to retain the free end 84a of strand 84 after severance of the strand 80 such that when the needle 62 swings downwardly from the knotter 48, as illustrated in FIG. 9, the strand 84 is drawn downwardly across the baling chamber in the path of travel of the next successive bale to place the strand 84 in readiness for making the next loop. This operation is repeated for each and every bale and is basically the same procedure utilized by conventional balers of the type herein illustrated.

It is to be recognized that when the procedure as just described is followed, a strand of binding material must be pulled through the interface between the bale being formed and the immediately preceding bale, such being illustrated for example, by the bale 82 being formed and tied in FIG. 8, and the preceding bale 86. That is, as the forming bale 82 is incrementally pushed through the chamber rearwardly of the bale case 20 by the intermittent packing action of the plunger 38, the length of the strand 80 along the top face of the bale 82 must necessarily increase in accordance with the increased distance between the knotter 48 and the preceding bale 86. When the pressure between the bales 82 and 86 is quite high, as in the case of large bales on the order of approximately one ton and having a density of approximately 16 pounds per cubic foot, the tension on the strand 80 can be very great, tending to break the latter or at least pull it from the knotter 48.

Accordingly, pursuant to the principles of the present invention, mechanism is provided to at least substantially eliminate the need for pulling strands through the pressurized, bale interface to avoid the problems of broken twine and knotter malfunction. A first of such mechanisms is illustrated in FIGS. 1-3 and 7-10 and is denoted broadly by the numeral 88. The mechanism 88 is primarily disposed on top of the bale case 20 forwardly of the knotters 48 and includes a generally triangular head 90 which is guided for fore-and-aft reciprocation along the bale case 20 by a centrally disposed, longitudinally extending track 92. Guide rollers 94 on opposite sides of the track 92 are carried by the head 90 to capture the track 92 therebetween and limit the head 90 to a preselected path of travel. As illustrated in FIG. 2, the head 90 may be reciprocated between a rearmost position shown in solid lines, and a forwardmost position shown in phantom lines.

The head 90 is reciprocated by a generally L-shaped driver 96 that is swingable about an upright pivot 98 on the topmost, right side of the bale case 20. The driver 96 contains an L-shaped, cam slot 100 adjacent its inner end that confines a follower 102 of the head 90 such that, as the driver 96 swings between its alternate positions shown in FIG. 2, the follower 102 moves back-and-forth along the length of the slot 100 to cause reciprocation of the head 90.

An outwardly extending crank end 96a of the driver 96 makes a ball and socket connection 104 with the forwardmost end of a diagonally extending push-pull rod 106 along the right side of the bale case 20. The rod 106 is pivotally connected at its rearmost end to the upper corner 74a of the crank plate 74 whereby the driving impetus for the mechanism 88 is derived from the needle yoke 64. Such connection assures, then, that the mechanism 88 and the apparatus 50 are intercoupled for synchronous operation.

The mechanism 88 further includes a series of push rod devices 108 which correspond in number to the knotters 48 and needles 62, and which extend rearwardly from the head 90 at laterally spaced intervals across the latter in alignment with the corresponding knotters 48. The top 44 of the bale case 20 behind the shaft 56 is longitudinally slotted such as to provide clearance for the push rods 108 and also to provide operating clearance for the needles 62 as they swing toward and away from the knotters 48. As illustrated in FIGS. 2 and 3, the push rods 108 are of such length that their rearmost ends 108a are disposed substantially rearwardly beyond the knotters 48 when the head 90 is in its rearmost position but are located slightly forwardly of the knotters 48 (and the needles 62 when they are fully raised) when the head 90 is in its forwardmost position. The rods 108 each carry an anti-friction roller 110 at their rearmost ends 108a, such rollers 110 being aligned with the twine strands associated with their respective knotters 48 to carry out the slackening function as will now be described.

OPERATION

During the baling process the slackening mechanism 88 is maintained in its solid line position as illustrated in FIG. 2, and the needles 62 are fully withdrawn, until such time as the clutch 54 is engaged to begin the tying procedure. This condition is illustrated also in FIG. 7 wherein it may be seen that the bale 82, through its incremental rearward movement relative to the bale case 20, has looped the strand 80 about three of its sides and it is now only necessary for the needles 62 to swing upwardly to the knotters 48 to complete the loop.

As the clutch 54 becomes engaged so as to swing the needles 62 upwardly as shown in FIG. 8, the driver 96 pulls the head 90 and push rods 108 forwardly along the track 92 until the rods 108 are disposed slightly forwardly of the knotters 48 as illustrated in FIG. 8 and in phantom in FIGS. 2 and 3. This permits the needles 62 to present the strand ends 80b and 84a to the knotters 48 for uniting the ends 80a and 80b such as to bind the bale 82. As the needles 62 then swing downwardly away from the knotters 48 as illustrated in FIG. 9, each needle 62 places the next strand 84 along the trailing end 82a of the bale 82 and in the path of travel in the next succeeding bale. Simultaneously with this action, the push rods 108 are forced rearwardly by the driver 96 such that the rollers 110 engage the strands 84 just below their retained ends 84a. By the time the needles 62 have been fully lowered to their FIG. 10 positions, the push rods 108 have completed their rearward movement such that each strand 84 has a supply of slack in the nature of a loop 112 drawn out along the upperface of the bale 82. By coordinating the rearward "throw" of the push rods 108 with the length of the bale 82, the total length of the slack loop 112 may be exactly equal to the length of the bale 82, it being understood that the slack loop 112 of each strand 84 consists of two leg stretches 112a and 112b which are interconnected by a bight and are doubled back one upon the other by the corresponding push rod 108.

Consequently, the new charges of crop material added to the baling chamber are packed rearwardly against the strand 84 to produce the next succeeding bale, and as that new bale is formed, it moves rearwardly within the chamber using up and progressively depleting the slack supply loop 112 until, finally, the new bale is in the position of the bale 82 in FIG. 7. It then becomes a "finished bale" ready to be tied by the procedure just described.

It is important to note that so long as the length of each bale is coordinated with the length of slack loop 112 such that they are equal to one another, there is absolutely no need for the strands to be pulled through the interface between a previous bale 86 and the forming bale 82. The "interface length" of the strand 80 (denoted by the numeral 80c) in FIGS. 7 and 8 and by the numeral 84c in FIG. 10 is, thus, rendered vertically motionless during the bale-forming procedure, and the only tension on the twine or wire at such time is that provided by the needles 62 and any tensioning device between the latter and the source of twine or wire supply.

ALTERNATIVE EMBODIMENT

FIGS. 4, 5 and 6 show a modified version of the mechanism 88, such being denoted by the numeral 114. In contrast to the mechanism 88, which is located primarily forwardly of the knotters 48, the mechanism 114 is disposed primarily rearwardly of the knotters 48. The mechanism 114 includes a cross member 116 spanning the bale case 20 above the latter. The member 116 has a pair of roller units 118 ajdacent opposite ends thereof, each of the units 118 being constructed as shown in detail in FIG. 6. Specifically, each of the units 118 has a pair of fore-and-aft spaced, lowermost rollers 120 which project laterally outwardly from an upright plate 122 for capture between the upper and lower confines 124 and 126, respectively, of a fore-and-aft extending track 128 along the corresponding side of the bale case 20, the lower confine 126 being defined by the top of the bale case 20 and the upper confine 124 being defined by a horizontal leg of an inverted angle member. In addition, the mechanism 114 includes a series of forwardly projecting eyelet devices 130 from the member 116, the eyelets corresponding in number to the knotters 48 and being equally spaced along the member 116 in alignment with the corresponding knotters 48.

Further, the mechanism 114 includes a pair of diagonally extending driver links 132 on opposite sides of the bale case 20, each of the links 132 being pivotally connected to the proximal end of the member 116 adjacent the upper ends of the links 132 through a longitudinal slot 134. The lower end of each link 132 rigidly carries a gear segment 136 which is intermeshed with a mating gear segment 138 on the needle yoke 64. The gear segments 138 are disposed concentrically with the pivots 66 of the yoke 64 such that, upon swinging movement of the latter, the eyelets 130 are reciprocated toward and away from the knotters 48 between the extreme positions illustrated in FIGS. 4 and 5.

It is to be noted that the segments 138 on the yoke 64 each include a section 138a at one circumferential extreme thereof which is devoid of gear teeth. Consequently, when the sections 138a are presented to the segments 136, there may be relative movement between the yoke 64 and the slackening mechanism 114. In effect, therefore, a lost motion connection is made between the yoke 64 and the mechanism 114, such being designed to take effect when the eyelets 130 are directly below the knotters 48 in aligned, overlying relationship with the needles 62.

Thus, the eyelets 130 experience a slight amount of dwell time during each operating cycle, and this provides opportunity for the needles 62 to "thread" the eyelets 130 and present the strand ends to the knotters 48 in the manner above described with respect to the first embodiment. Such dwell time also provides opportunity for the needles 62 to retract through the eyelets 130 as the needles 62 return to their lowered positions.

Inasmuch as each needle 62 pulls a strand of twine or wire downwardly through its corresponding eyelet 130 during the down-stroke of the needle 62, subsequent rearward movement of the eyelets 130 brought about by the re-meshing of the segments 136 and 138, causes a slack supply loop to be drawn by the eyelets 130 on top of the previously tied bale. This is similar to the action illustrated in FIG. 10 with respect to the first embodiment, although there the rods 108 "push" the slack supply loop 112 into position while in mechanism 114, the eyelets 130 "pull" the slack supply loop into position. From that point on, the slack supply loop is depleted in the same manner as explained with regard to the first embodiment and with the same beneficial results.

Having thus described the invention, what is claimed as new and desired to be secured by Letters Patent is:

1. In a baling method where a bale is forced through a baling chamber and progressively increased in size by the intermittent packing of additional material against the trailing end of the bale, the steps of:
   presenting one end of a binding strand to a stationary holder on the top of the chamber in such a manner that the strand extends across the chamber for subsequent capture within the interface between a bale under formation and a preceding bale;
   drawing a slack loop in the strand equal to the length of the bale to be formed,
   said loop having a bight and a pair of legs interconnected by the bight, one of said legs leading from said bight to said holder and the other of said legs leading from said bight to a source of strand supply;
   placing at least said other leg of the loop on the top surface of the preceding bale with said other leg extending parallel to the path of travel of the preceding bale;
   carrying said other leg in the direction of bale travel on said top surface during bale formation so as to progressively deplete the loop, lengthen said one leg along the top surface of the bale being formed, and shorten said other leg;
   progressively obtaining an additional length of strand from said source of supply during said carrying step and extending the same along the bottom surface of the forming bale so as to preclude movement of the strand through said interface during bale formation; and
   presenting the opposite end of the strand to the holder upon depletion of said loop for joining said ends together.

2. In a baling method as claimed in claim 1, wherein said loop is drawn by pushing transversely against the strand and doubling the same back upon itself.

3. In a baling method as claimed in claim 1, wherein said loop is drawn by pulling transversely on the strand and doubling the same back upon itself.

4. In a baling method as claimed in claim 1, wherein said drawing and placing steps are carried out in the same motion and said bight of the loop is positioned substantially midway along the top surface of the preceding bale at the completion of said motion.

* * * * *